(12) United States Patent
Yuasa

(10) Patent No.: US 12,539,771 B2
(45) Date of Patent: *Feb. 3, 2026

(54) CONTROL SYSTEM FOR ELECTRIC VEHICLE

(71) Applicant: TOYOTA JIDOSHA KABUSHIKI KAISHA, Toyota (JP)

(72) Inventor: Ryohei Yuasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,367

(22) Filed: Jun. 27, 2024

(65) Prior Publication Data
US 2025/0083533 A1   Mar. 13, 2025

(30) Foreign Application Priority Data
Sep. 13, 2023  (JP) .................. 2023-148753

(51) Int. Cl.
*F16H 61/18* (2006.01)
*B60L 15/20* (2006.01)
(Continued)

(52) U.S. Cl.
CPC ............... *B60L 15/20* (2013.01); *G07C 5/02* (2013.01); *G10K 15/02* (2013.01);
(Continued)

(58) Field of Classification Search
CPC ............... B60L 15/20; B60L 2240/32; B60L 2240/421; B60L 2240/423; B60L 2260/20;
(Continued)

(56) References Cited

U.S. PATENT DOCUMENTS

2020/0292062 A1   9/2020  Kawasaki et al.
2021/0229550 A1   7/2021  Isami
(Continued)

FOREIGN PATENT DOCUMENTS

EP    2703243 A1   3/2014
JP    6787507 B1   11/2020
(Continued)

OTHER PUBLICATIONS

Reyes, Alvin. "What Is Hyundai's N E-Shift, And How Does It Work?" Cars. 2023.
(Continued)

*Primary Examiner* — Tisha D Lewis
(74) *Attorney, Agent, or Firm* — Oliff PLC

(57) ABSTRACT

A control system for an electric vehicle (Ve) configured to allow a driver to enjoy behaviors of conventional vehicles having an engine and a transmission more realistically, without impairing comfort and quietness of the electric vehicle (Ve). An operating mode of the electric vehicle (Ve) is selected from a first mode to a fourth mode. In the third mode a driver is allowed to enjoy a virtual shifting operation and a simulated engine sound is emitted. In the fourth mode, an availability of the virtual shifting operation and the emission of the simulated engine sound are maintained. The third mode is cancelled by shifting to the first mode or the fourth mode; and the fourth mode is cancelled by shifting to the third mode.

4 Claims, 9 Drawing Sheets

(51) Int. Cl.
    *B60W 30/182* (2020.01)
    *G07C 5/02* (2006.01)
    *G10K 15/02* (2006.01)

(52) U.S. Cl.
    CPC ..... *B60L 2240/32* (2013.01); *B60L 2240/421* (2013.01); *B60L 2240/423* (2013.01); *B60L 2260/20* (2013.01); *F16H 61/18* (2013.01)

(58) Field of Classification Search
    CPC ...... B60L 2200/00; B60L 50/50; B60L 50/00; B60L 2270/42; G10K 15/02; G07C 5/02; F16H 61/18
    See application file for complete search history.

(56) References Cited

U.S. PATENT DOCUMENTS

| | | |
|---|---|---|
| 2022/0001751 A1 | 1/2022 | Umetsu et al. |
| 2022/0041157 A1* | 2/2022 | Imamura ............... B60W 10/06 |
| 2023/0322094 A1 | 10/2023 | van Nus |
| 2024/0160808 A1* | 5/2024 | Pang ....................... G06F 30/20 |
| 2025/0058710 A1* | 2/2025 | Cho .......................... H04R 3/00 |

FOREIGN PATENT DOCUMENTS

| | | |
|---|---|---|
| JP | 2022-012205 A | 1/2022 |
| JP | 2022-030562 A | 2/2022 |
| JP | 2022-034647 A | 3/2022 |
| JP | 2022-034649 A | 3/2022 |

OTHER PUBLICATIONS

Oct. 27, 2025 Notice of Allowance issued in U.S. Appl. No. 18/762,808.

* cited by examiner

CONTROL SYSTEM FOR ELECTRIC VEHICLE

CROSS-REFERENCE TO RELATED APPLICATIONS

The present disclosure claims the benefit of Japanese Patent Application No. 2023-148753 filed on Sep. 13, 2023 with the Japanese Patent Office.

BACKGROUND

Field of the Invention

Embodiments of the present disclosure relate to the art of a control system for an electric vehicle in which a motor serves as a prime mover.

Discussion of the Related Art

JP-A-2022-12205 discloses one example of an electric automobile in which a motor is adopted as a prime mover. The electric automobile described in JP-A-2022-12205 comprises a paddle switch and a shifter (or a shift lever) electrically connected to an electronic control unit. According to the teachings of JP-A-2022-12205, the electronic control unit is configured to control output torque of a motor with reference to a torque map determining the output torque with respect to a position of an accelerator pedal, and to select the torque map in response to an operation of the paddle switch or the shifter. In the electric automobile described in JP-A-2022-12205, therefore, characteristics of the motor torque is changed by changing the torque map so that the drive force to propel the electric automobile is changed stepwise to imitate a speed change operation of a multiple-stage transmission.

JP-B1-6787507 describes an electric vehicle that allows a driver to virtually enjoy a manual gear change operation of a conventional vehicle having a manual transmission. For this purpose, the electric vehicle described in JP-B1-6787507 is provided with a shift lever and a clutch pedal operated cooperatively as in the vehicle having a manual transmission. The electric vehicle is further provided with a torque controller configured to control torque of an electric motor serving as a prime mover in response to an operation amount of the clutch pedal. According to the teachings of JP-B1-6787507, the shift device is configured to select a mode of any one of a plurality of modes in which torque characteristics of the electric motor differ in stages with respect to a rotational speed of the electric motor, and the torque controller controls the torque of the electric motor in accordance with the mode selected by the shift device. In addition, according to the teachings of JP-B1-6787507, a virtual (i.e., imitation) engine sound is added in response to operations of the shift device and the clutch pedal. To this end, the torque controller acquires a virtual engine speed that simulates an engine speed assuming that a traveling condition of the electric vehicle is realized by a drive force of an engine based on a driving state of the electric vehicle, and the engine sound is generated in accordance with the virtual engine speed.

The motor employed as a prime mover in the electric vehicles of those kinds can generate large torque even when launching and when travelling at a low speed. Therefore, some of electric vehicles are not provided with a transmission for multiplying driving torque. Likewise, both of the electric vehicles described in the above-mentioned prior art documents do not have a transmission, but those electric vehicles are individually provided with the imitation shift device and the shift switch. In addition, in the above-mentioned electric vehicles, torque characteristics of the motor may be changed by manually changing the torque map or the mode to imitate behavior of the conventional vehicle having a transmission. For example, according to the teachings of JP-A-2022-12205, the driver is allowed to virtually enjoy a manual shifting operation (i.e., a sequential shifting) by manipulating a paddle switch or a shift lever as in the conventional vehicle having a manual transmission. Likewise, according to the teachings of JP-B1-6787507, the driver is also allowed to virtually enjoy a manual shifting operation and behaviors of the conventional vehicle having a manual transmission. In addition, the virtual engine sound is emitted in response to an execution of the virtual shifting operation so as to enhance the reality.

In the electric vehicles, the drive force derived from the output torque of the motor may be controlled smoothly and seamlessly, and hence noises and vibrations of the electric vehicles are less than those of the conventional vehicles having engines. That is, the above-mentioned virtual engine sound is unnecessary to maintain such advantages of the electric vehicles. Therefore, in the electric vehicles having a function to allow the driver to virtually enjoy a manual shifting operation, it is preferable to select an operating mode from a normal mode in which the virtual shifting operation is not available, and a manual mode in which the virtual engine sound is emitted in response to an execution of the virtual shifting operation. In the electric vehicles described in the above-mentioned prior art documents, for example, the normal mode is selected by positioning the shift lever at a drive position, and the virtual engine sound is not emitted during propulsion in the normal mode. Whereas, the manual mode is selected by positioning the shift lever at a manual position, and in the manual mode, the virtual engine sound is emitted in response to an execution of the virtual shifting operation. Thus, in the electric vehicles described in the above-mentioned prior art documents, drivers are allowed to enjoy the behaviors of the conventional vehicles having an engine and a transmission by emitting the virtual engine sound in response to an execution of the virtual shifting operation.

However, in the electric vehicles described in the above-mentioned prior art documents, the virtual engine sound is lost awkwardly when the shift lever is moved from the manual position to another position. For example, in a situation where the electric vehicle propelled in the manual mode is stopped to park, the virtual engine sound is lost suddenly when the shift lever is moved from the drive position to a reverse position or a parking position. In addition, a revving sound may not be emitted virtually even if the driver depresses an accelerator pedal in the situation where the shift lever is positioned at the parking position or a neutral position.

Thus, the conventional electric vehicles have to be improved to imitate the behaviors of the conventional vehicle having an engine and a transmission more realistically, without impairing comfort and quietness of the electric vehicles.

SUMMARY

Aspects of embodiments of the present disclosure have been conceived noting the foregoing technical problems, and it is therefore an object of the present disclosure to provide a control system for an electric vehicle configured to allow a driver to enjoy the behavior of the conventional vehicle having an engine and a transmission more realistically, without impairing comfort and quietness of the electric vehicle.

The present disclosure relates to the art of a control system for an electric vehicle that controls a motor serving as a prime mover based on a target torque value set in accordance with a required drive force. In order to achieve the above-explained objective, according to the exemplary embodiment of the present disclosure, the control system is provided with: a sound creator that creates a simulated engine sound in accordance with a travelling condition of the electric vehicle; a controller that controls an output torque of the motor based on the target torque value; and a shifting device that is operated manually by a driver. The shifting device that is operated manually by a driver to: select an operating mode of the electric vehicle from a first mode, a second mode, a third mode, and a fourth mode; and select an operating range of the electric vehicle from a plurality of ranges in which torque characteristics with respect to a speed of the motor differ from one another, in a situation where the third mode or the fourth mode is selected. Specifically, the first mode corresponds to a drive mode in which the electric vehicle is propelled forward. The second mode includes a reverse mode in which the electric vehicle is reversed, a parking mode in which the electric vehicle is parked, and a neutral mode in which a torque transmission between the motor and a pair of drive wheels is interrupted. The third mode is shifted from the first mode, and in the third mode, the target torque value of the motor with respect to a speed of the motor varies stepwise in accordance with the operating range selected by operating the shifting device, and the simulated engine sound is emitted by the sound creator. The fourth mode is shifted from the first mode or the third mode, and in the fourth mode, the target torque value of the motor also varies stepwise in accordance with the operating range selected by operating the shifting device, and the emission of the simulated engine sound is maintained. The controller is configured to: control the output torque of the motor based on the target torque value set in accordance with the operating mode and the operating range selected by operating the shifting device; cancel the third mode being selected when the operating mode is shifted from the third mode to the first mode or the fourth mode; and cancel the fourth mode shifted from the third mode when the operating mode is shifted from the fourth mode to the third mode.

In a non-limiting embodiment, the operation of the shifting device may be categorized into a first operation as a normal operation and a second operation different from the first operation. For example, the operating mode may be shifted by the first operation between the first mode and the second mode, between the first mode and the third mode, from the third mode to the second mode, from the fourth mode to the first mode, from the fourth mode to the second mode, and from the fourth mode to the third mode. However, an operation of the shifting device to shift the operating mode from the second mode to the third mode or the fourth mode is rejected. Whereas, the operating mode is shifted by the second operation from the first mode to the fourth mode, and from the third mode to the fourth mode.

In a non-limiting embodiment, the controller may be further configured to calculate a virtual engine speed based on an assumption that a drive force to propel the electric vehicle in a current travelling condition is generated by a conventional internal combustion engine. In addition, the sound creator may be configured to emit the simulated engine sound in accordance with a change in the virtual engine speed.

Thus, the control system according to the exemplary embodiment of the present disclosure is applied to the electric vehicle that is propelled by the output torque of the motor serving as a prime mover. According to the exemplary embodiment of the present disclosure, the output torque of the motor is controlled based on the target torque value set in accordance with the required drive force as a target drive torque or a required drive torque. The target torque value is determined with reference to the maps in which torque characteristics are different from one another, and the torque map is selected by manually operating the shifting device. The operating mode of the electric vehicle is also selected by manually operating the shifting device from the first mode, the second mode, the third mode, and the fourth mode. Specifically, the first mode in which the electric vehicle is propelled forward is selected by moving the shift lever of the shifting device to the drive position. The second mode includes the parking mode, the reverse mode, and the neutral mode. That is, the second mode is selected by moving the shift lever of the shifting device to the parking position, the reverse position, or the neutral position. The third mode as the manual mode is selected by moving the shift lever of the shifting device to the manual position, and in the third mode, the operating range is selected manually by operating the shifting device. The fourth mode is shifted from the third mode, and the operating range is also selected manually in the fourth mode by operating the shifting device. In the third mode or the fourth mode, therefore, the torque characteristics of the motor is changed manually in response to the operation of the shifting device. That is, the target torque value of the motor varies stepwise in accordance with the operating range selected manually by operating the shifting device. For example, the operating range may be shifted from a default range to a range in which a relatively larger torque is generated at a low speed. According to the exemplary embodiment of the present disclosure, therefore, the driver of the electric vehicle is allowed to virtually enjoy a manual shifting operation as in the conventional vehicle having a manual transmission or a multiple-stage transmission.

As described, the control system according to the exemplary embodiment of the present disclosure is provided with the sound creator configured to emit the simulated engine sound in the third mode and the fourth mode in accordance with the operating condition of the electric vehicle. Therefore, the driver of the electric vehicle is allowed to enjoy behaviors of the conventional vehicle having an engine and a transmission. Once the fourth mode is selected, the emission of the simulated engine sound is maintained even if the operating mode is shifted to other mode. Specifically, the third mode is cancelled by shifting the operating mode from the third mode to the first mode or the fourth mode. That is, the third mode will not be cancelled even if the operating mode is shifted from the third mode to the second mode, and the simulated engine sound is emitted continuously in this case. On the other hand, the fourth mode is cancelled by shifting the operating mode from the fourth mode to the third mode. That is, the fourth mode will not be cancelled even if the operating mode is shifted from the fourth mode to the first mode or the second mode, and the simulated engine sound is also emitted continuously in this case. Then, even if the operating mode is shifted from the second mode to other mode, the fourth mode is still maintained and the simulated engine sound is emitted continuously. Likewise, even if the operating mode is shifted from the fourth mode to the first mode, the fourth mode is still maintained and the simulated engine sound is emitted continuously. In a case that the operating mode is shifted from the fourth mode to the third mode and hence the fourth mode is cancelled, the virtual shifting operation is still available and the simulated engine sound is emitted continuously as long as the third mode is maintained. Then, when the operating mode is shifted from the third mode to the first mode, the operating mode is returned to the normal mode and the emission of the simulated engine sound is terminated.

Thus, according to the exemplary embodiment of the present disclosure, the simulated engine sound will not be lost even if the operating mode is shifted from the third mode as the manual mode or the fourth mode as the manual hold mode to the second mode as the parking mode, the reverse mode, and the neutral mode. For example, in a situation where the electric vehicle being operated in the third mode or the fourth mode is stopped and parked, the simulated engine sound will not be lost even if the shift lever of the shifting device is moved from the manual position to the reverse position or the parking position. In addition, a simulated revving sound may be emitted in the parking mode or the neutral mode by depressing the accelerator pedal.

According to the exemplary embodiment of the present disclosure, the operation of the shifting device is categorized into the first operation and the second operation. For example, the first operation as a normal operation includes an operation to move the shift lever and an operation of a paddle shifter for a normal period of time, and the second operation includes an operation of the paddle shifter for a longer period of time and an operation of a dedicated switch device. Specifically, the operating mode is shifted from the first mode or the third mode to the fourth mode by the second operation. That is, the driver executes the second operation intentionally to keep emitting the simulated engine sound in the fourth mode. Therefore, the driver is allowed to enjoy the behavior of the conventional vehicle having an engine and a transmission certainly in line with his/her intention. The fourth mode is cancelled only by shifting the operating mode from the fourth mode to the first mode via the third mode to operate the electric vehicle in the first mode as the electric vehicle mode in which the electric vehicle is propelled quietly. Thus, the operating mode and the operating range may be shifted by the first operation and the second operation as in the conventional vehicle having an engine and a transmission.

According to the exemplary embodiment of the present disclosure, therefore, the driver is allowed to virtually enjoy the manual shifting operation as real as in the conventional vehicle having an engine and a transmission.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
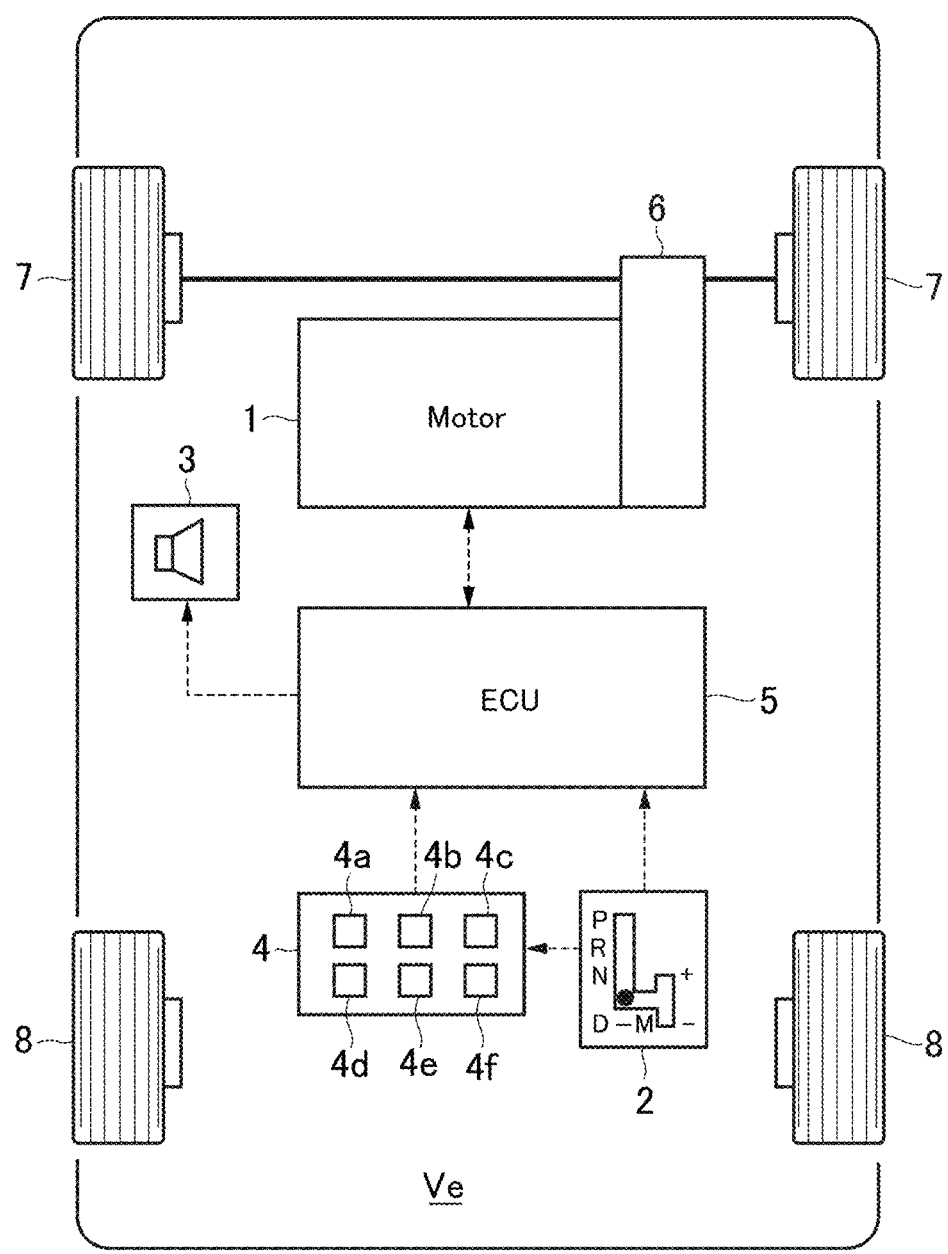
FIG. 1 is a schematic illustration showing a structure of the electric vehicle to which the control system according to the exemplary embodiment of the present invention is applied.

Referring now to FIG. 1, there is shown one example of a structure of an electric vehicle (hereinafter simply referred to as the vehicle) Ve to which the control system according to the embodiment of the present disclosure is applied. As illustrated in FIG. 1, the vehicle Ve is an electric vehicle comprising a motor 1 as a prime mover, a shifting device 2, a sound creator 3, a detector 4, and a controller (referred to as ECU in FIG. 1) 5.

Although not shown in FIG. 1, one or more extra motor(s) may be arranged in the vehicle Ve in addition to the motor 1. Instead, the control system according to the embodiment of the present disclosure may also be applied to a hybrid vehicle in which a prime mover includes an engine and a motor. Specifically, the vehicle Ve illustrated in FIG. 1 is a front-wheel-drive layout vehicle in which an output torque of the motor 1 is delivered to a pair of front wheels 7 through a reduction mechanism (not shown) and a differential gear unit 6 to establish drive force to propel the vehicle Ve by the front wheels 7. Otherwise, the control system according to the embodiment of the present disclosure may also be applied to a rear-wheel-drive layout vehicle in which an output torque of the motor 1 is delivered to a pair of rear wheels 8 through a propeller shaft (not shown) to establish drive force to propel the vehicle Ve by the rear wheels 8. In addition, the control system according to the embodiment of the present disclosure may also be applied to a four-wheeldrive layout vehicle in which an output torque of the motor 1 is delivered to both pair of the front wheels 7 and the rear wheels 8 through a transfer (not shown) to propel the vehicle Ve.

For example, a permanent magnet synchronous motor and an induction motor may be adopted as the motor 1. That is, the motor 1 is a motor-generator that serves not only as a motor to generate torque when driven by electricity suppled thereto, but also as a generator to generate electricity when rotated by a torque applied thereto. In the vehicle Ve, specifically, a battery (not shown) is connected to the motor 1 through an inverter (not shown). Therefore, the motor 1 may be operated as a motor to generate drive torque to propel the vehicle Ve by supplying electricity to the motor 1 from the battery. Instead, the motor 1 may also be operated as a generator to generate electricity by rotating the motor 1 by a torque delivered from the front wheels 7. In this case, the electricity generated by the motor 1 may be accumulated in the battery. A rotational speed and an output torque of the motor 1 is electrically controlled by a controller 5 as an electronic control unit. For example, an output torque of the motor 1 may be controlled based on a required drive torque as a target torque value. Specifically, the required drive torque is set in accordance with a required drive force calculated based on a position of an accelerator pedal (not shown) operated by the driver and a speed of the vehicle Ve. As explained later, according to the exemplary embodiment of the present disclosure, the required drive torque is determined with reference to a torque map selected in accordance with an operating range selected by the shifting device 2.

Figure 2:
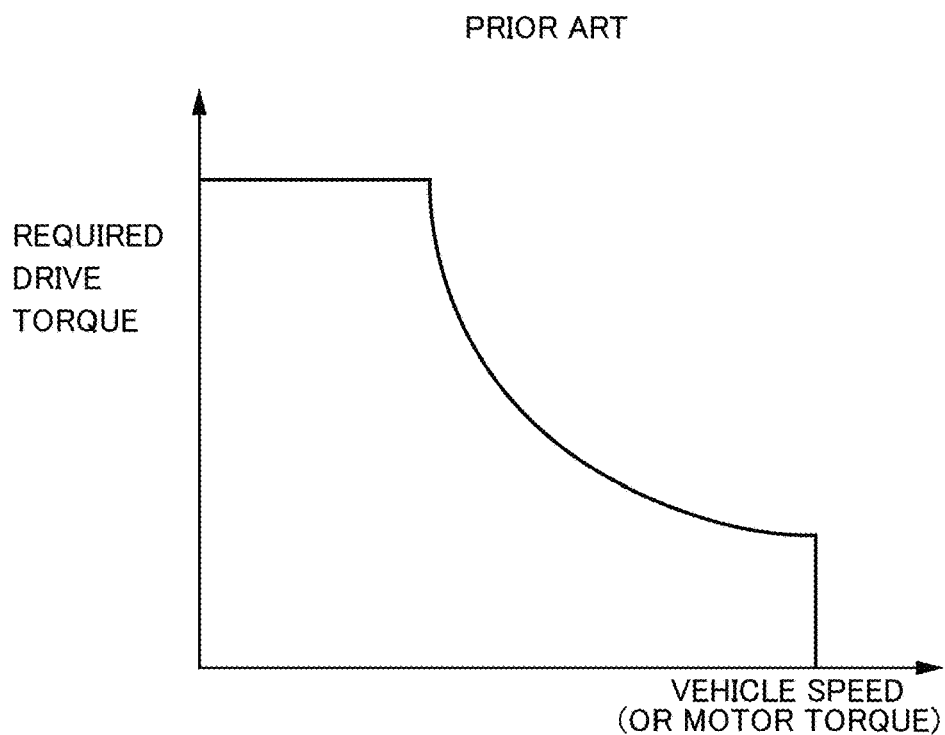
FIG. 2 is a map for determining torque characteristics of a motor employed commonly in electric vehicles.
Figure 3:
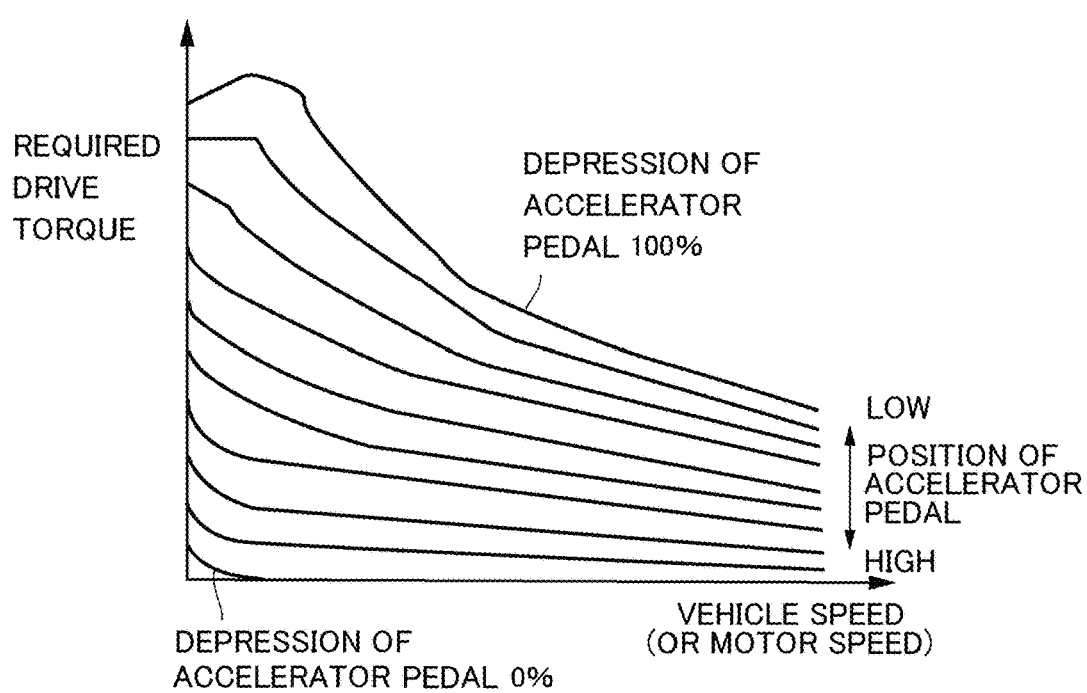
FIG. 3 is a map for determining a required drive torque to be generated by the motor based on a speed of the electric vehicle and a depression of an accelerator pedal.

Turning to FIG. 2, there are shown the torque characteristics of the motor 1. In FIG. 2, specifically, the vertical axis represents a required drive torque, and the horizontal axis represents a speed of the vehicle Ve. The speed of the vehicle Ve may be considered as a rotational speed of the motor 1 taking account of a gear ratio between the motor 1 and the front wheels 7. For example, according to the exemplary embodiment of the present disclosure, the required drive torque as the target torque value of the motor 1 is determined with reference to the torque map shown in FIG. 3. The torque map shown in FIG. 3 is configured to determine the required drive torque to be generated by the motor 1 based on the torque characteristics of the motor 1 shown in FIG. 2, in accordance with the speed of the vehicle Ve corresponding to the speed of the motor 1 and the position (i.e., a depression) of the accelerator pedal. Such torque map shown e.g., in FIG. 3 is prepared for each operating range to propel the vehicle Ve, and each of the torque maps is configured to calculate the required drive torque in different values with respect to a predetermined depression of the accelerator pedal. Specifically, FIG. 3 shows the torque map for determining the required drive torque to be generated by the motor 1 in a case that e.g., a shift lever 2b of an after-mentioned lever shifter 2a adopted as the shifting device 2 is positioned at a drive position to select a drive mode.

Figure 4:
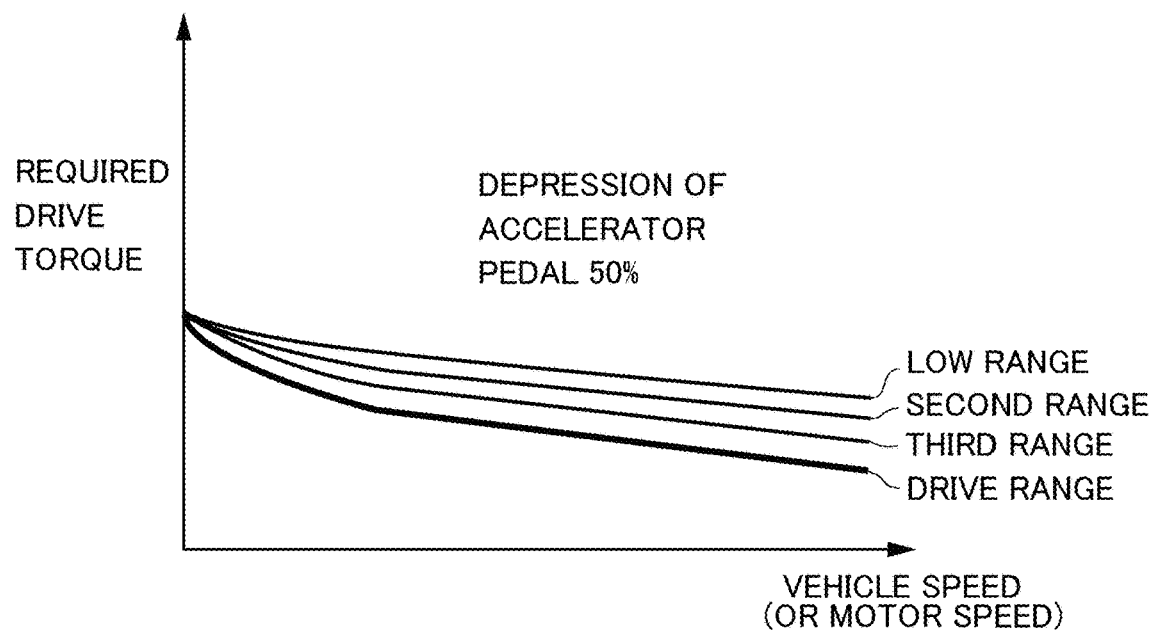
FIG. 4 is a graph indicating the required drive torques in each operating range given that a depression of an accelerator pedal is 50%.

Turning to FIG. 4, there is shown the required drive torque in each of the operating ranges given that a depression of the accelerator pedal is 50%. As shown in FIG. 4, the required drive torque changes depending on the operating range selected from a drive range, a third range, a second range, and a low range (i.e., a first range). Specifically, the required drive torque set in the operating ranges increases in order of the drive range, the third range, the second range, and the low range. For example, the drive range is selected in a situation where the drive mode is selected to propel the vehicle Ve in a normal manner, and the required drive torque calculated in the drive range is the default required drive torque. In a case that the third range is selected, the required drive torque is calculated to be one step greater than the required drive torque calculated in the drive range. Likewise, in a case that the second range is selected, the required drive torque is calculated to be one step greater than the required drive torque calculated in the third range. Also, in a case that the low range is selected, the required drive torque is calculated to be one step greater than the required drive torque calculated in the second range.

The shifting device 2 is manipulated by the driver to select the operating range and an operating mode of the vehicle Ve, and the torque map is selected in accordance with the operating range selected by operating the shifting device 2. The vehicle Ve to which the control system according to the exemplary embodiment of the present disclosure is applied is not provided with a transmission employed in the conventional vehicles. Accordingly, it is not necessary to operate the transmission in a manual mode by manipulating the shifting device 2. Nonetheless, in order to allow the driver to virtually enjoy a manual shifting operation of the conventional vehicle having a transmission, the vehicle Ve is provided with the shifting device 2, and the above-mentioned torque maps are prepared to imitate the behavior of the conventional vehicle. For example, in a normal mode as an electric vehicle mode, the shifting device 2 is operated among the drive position at which the drive mode is selected to propel the vehicle Ve forward by the output torque of the motor 1, a reverse position at which a reverse mode is selected to reverse the vehicle Ve, a parking position at which a parking mode is selected to park the vehicle Ve, and a neutral position at which a neutral mode is selected to interrupt a torque transmission between the motor 1 and the pair of front wheels 7.

Figure 5:
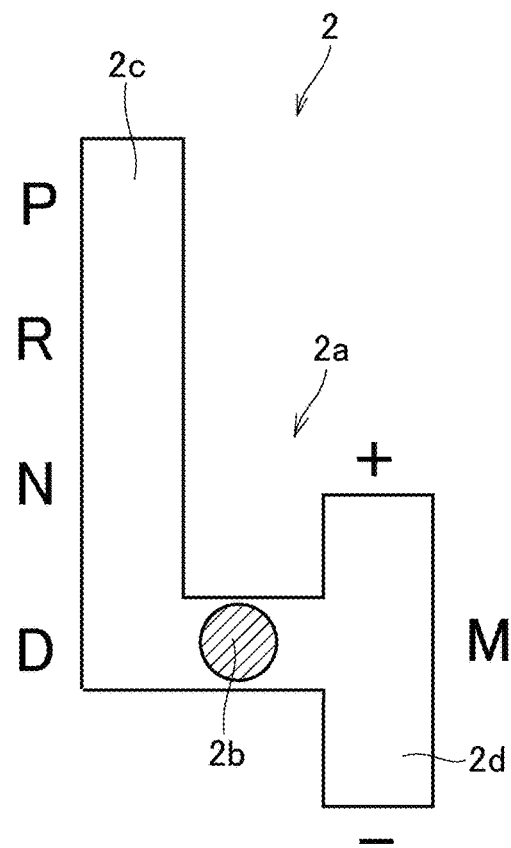
FIG. 5 is a schematic illustration showing a structure of a shifting device having a shift lever and a shift gate.

According to the exemplary embodiment of the present disclosure, the lever shifter 2a shown in FIG. 5 is adopted as the shifting device 2. The lever shifter 2a is manipulated manually by the driver to select the operating range and the operating mode of the vehicle Ve, and the operating range and the operating mode selected by the shifting device 2 are transmitted to the controller 5 in the form of command signals.

As illustrated in FIG. 5, as a manual shifting device employed in the conventional vehicles having a multiple-stage manual transmission, the lever shifter 2a comprises a shift lever 2b, and shift gates 2c and 2d. Specifically, the vehicle Ve is operated in the normal mode in which the vehicle Ve is operated as a normal electric vehicle by placing the shift lever 2b within the left gate 2c. In this case, the operating mode may be selected from the drive mode, the neutral mode, the reverse mode, and the parking mode, by moving the shift lever 2b within the left gate 2c to the drive (D) position, the neutral (N) position, the reverse (R) position, or the parking (P) position. Whereas, the vehicle Ve is operated in the manual mode by moving the shift lever 2b to a manual position located in the right gate 2d. In this case, the operating range is shifted to a range one range higher than the current operating range by moving the shift lever 2b to an upshifting (+) position, and consequently the required drive torque is reduced to a value one step smaller than the prior value. That is, by thus moving the shift lever 2b to the upshifting position within the right gate 2d, a shifting operation of the operating range is executed in a similar manner as an upshifting of the conventional transmission. By contrast, the operating range is shifted to a range one range lower than the current operating range by moving the shift lever 2b to a downshifting (−) position, and consequently the required drive torque is increased to a value one step larger than the prior value. That is, by thus moving the shift lever 2b to the downshifting position within the right gate 2d, a shifting operation of the operating range is executed in a similar manner as a downshifting of the conventional transmission.

Figure 6:
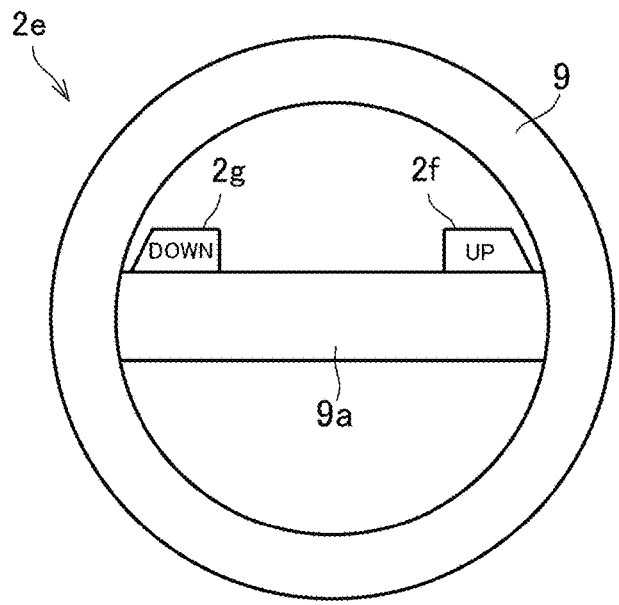
FIG. 6 is a schematic illustration showing a structure of a paddle shifter arranged in a steering wheel.

According to the exemplary embodiment of the present disclosure, the shifting device 2 includes a paddle shifter 2e shown in FIG. 6 that is arranged in a steering wheel 9. As illustrated in FIG. 6, the paddle shifter 2e comprises an upshifting paddle 2f and a downshifting paddle 2g arranged on the reverse side of a spoke 9a of the steering wheel 9. The operating range is also shifted to a range one range higher than the current operating range by pulling the upshifting paddle 2f, and consequently the required drive torque is reduced to a value one step smaller than the prior value. That is, a shifting operation of the operating range is also executed in a similar manner as an upshifting of the conventional transmission. By contrast, the operating range is also shifted to a range one range lower than the current operating range by pulling the downshifting paddle 2g, and consequently the required drive torque is increased to a value one step larger than the prior value. That is, a shifting operation of the operating range is also executed in a similar manner as a downshifting of the conventional transmission.

A procedure of the shifting operation of the operating range by manipulating the shifting device 2 is similar to that of a sequential shifting of the conventional multiple-stage automatic transmission in the manual mode. Here will be explained an example of the shifting operation by manipulating the lever shifter 2a. Given that the shift lever 2b is positioned at the drive position in the normal mode, the vehicle Ve is operated in the drive mode. In this situation, the operating mode is shifted to the manual mode by moving the shift lever 2b from the drive position to a manual position located in the right gate 2d, and the operating range is shifted to the third range by moving the shift lever 2b to the downshifting position in the right gate 2d. Consequently, the required drive torque is increased to a value one step larger than the value previously set in the drive range. The operating range is further shifted to the second range by moving the shift lever 2b to the downshifting position in the right gate 2d again (i.e., two times), and consequently the required drive torque is increased two steps greater than the value previously set in the drive range. Likewise, the operating range is further shifted to the low range by moving the shift lever 2b to the downshifting position in the right gate 2d again (i.e., three times), and consequently the required drive torque is increased three steps greater than the value previously set in the drive range. By contrast, given that the vehicle Ve is operated in the low range, the operating range is shifted to the second range by moving the shift lever 2b to the upshifting position in the right gate 2d, and consequently the required drive torque is reduced one step smaller than the value previously set in the low range. The operating range is further shifted to the third range by moving the shift lever 2b to the upshifting position in the right gate 2d again (i.e., two times), and consequently the required drive torque is reduced two steps smaller than the value previously set in the low range. Likewise, the operating range is further shifted to the drive range by moving the shift lever 2b to the upshifting position in the right gate 2d again (i.e., three times), and consequently the required drive torque is reduced three steps smaller than the value previously set in the low range. Likewise, the operating range is also shifted downwardly stepwise every time the downshifting paddle 2g is pulled, and also shifted upwardly stepwise every time the upshifting paddle 2f is pulled.

In the vehicle Ve, a switch shifter (not shown) may also be arranged in the steering wheel 9 instead of the paddle shifter 2e. In this case, for example, a pair of upshifting switches may be arranged on the front side of the spoke 9a of the steering wheel 9, and a pair of downshifting switches may be arranged on the reverse side of the spoke 9a of the steering wheel 9.

According to the exemplary embodiment of the present disclosure, operations of the shifting device 2 is categorized into at least a first operation as a normal operation, and a second operation that is different from the first operation to be executed for a different purpose from that of the first operation. Specifically, the first operation includes an operation to move the shift lever 2b of the lever shifter 2a in the shift gates 2c and 2d to shift the operating mode and the operating range, and operations of the upshifting paddle 2f and the downshifting paddle 2g of the paddle shifter 2e for a short (i.e., normal) period of time to shift the operating range upwardly or downwardly. Whereas, the second operation includes operations of the shift lever 2b, the upshifting paddle 2f, and the downshifting paddle 2g for a longer period of time to shift the operating mode to an aftermentioned manual hold mode, and an operation of a dedicated switch device (not shown) to shift the operating mode to the manual hold mode.

The sound creator 3 is configured to create a simulated engine sound or an amplified motor sound in accordance with a travelling condition of the vehicle Ve including a speed of the vehicle Ve, a speed of the motor 1, and a virtual engine speed. The sound creator 3 may be provided with a calculator configured to calculate the simulated engine sound, and the simulated engine sound created by the sound creator 3 may be emitted from a dedicated speaker or a speaker of a car audio system (neither of which are shown). Otherwise, the simulated engine sound may also be calculated by the controller 5, and the simulated engine sound calculated by the controller 5 may be created by the sound creator 3 and emitted from those speakers. According to the exemplary embodiment of the present disclosure, therefore, the simulated engine sound is emitted in response to the operation of the instrument so that the driver is allowed to virtually enjoy the manual shifting operation of the conventional vehicle having a transmission.

To this end, specifically, the controller 5 or the calculator of the sound creator 3 is configured to calculate the virtual engine speed based on an assumption that the drive force to propel the vehicle Ve in a current travelling condition is generated by a conventional internal combustion engine. That is, the simulated engine sound created by the sound creator 3 based on the virtual engine speed varies in accordance with a change in the virtual engine speed. According to the exemplary embodiment of the present disclosure, therefore, it is possible to imitate the behaviors of the conventional vehicle having an engine and a transmission more realistically. In addition, in the situation where the parking mode or the neutral mode is selected, a revving sound may be emitted virtually by increasing the virtual engine speed in accordance with a depression of the accelerator pedal.

In order to collect data and information required to control the vehicle Ve, the detector 4 comprises a power supply unit, a microcomputer, a sensor, and an input/output interface. For example, the detector 4 collects data relating to operating conditions of the vehicle Ve, the motor 1, and the shifting device 2, and data required to control the motor 1 and the sound creator 3. To this end, the detector 4 comprises: a vehicle speed sensor 4a that detects a speed of the vehicle Ve; an accelerator sensor 4b that detects a position (i.e., a depression) of the accelerator pedal; a shift position sensor 4c that detects a position of the shift lever 2b of the lever shifter 2a; a motor speed sensor (or a resolver) 4d that detects a rotational speed of the motor 1; an acceleration sensor 4e that detects an acceleration of the vehicle Ve; and an SOC sensor 4f that detects a state of charge level of a battery (not shown). The detector 4 is electrically connected to the controller 5 so that the detection data collected by the above-mentioned sensors is transmitted to the controller 5 in the form of an electric signal.

The controller 5 is an electronic control unit comprising a microcomputer for controlling the vehicle Ve. According to the exemplary embodiment of the present disclosure, specifically, the controller 5 is configured to control an output torque of the motor 1. To this end, various data collected or calculated by the detector 4 is transmitted to the controller 5, and the controller 5 performs calculation using the incident data, data stored in advance, a calculation formula etc. The calculation result is transmitted from the controller 5 in the form of a command signal to control the output torque of the motor 1. In addition, the controller 5 calculates the simulated engine sound to be emitted from the speaker of the sound creator 3. Otherwise, the controller 5 controls the simulated engine sound created by the sound creator 3 by transmitting a command signal to the calculator of the sound creator 3. Although only one controller 5 is arranged in the vehicle Ve shown in FIG. 1, a plurality of controllers 5 may also be arranged in the vehicle Ve to control different devices individually, or to perform different controls individually.

Figure 7:
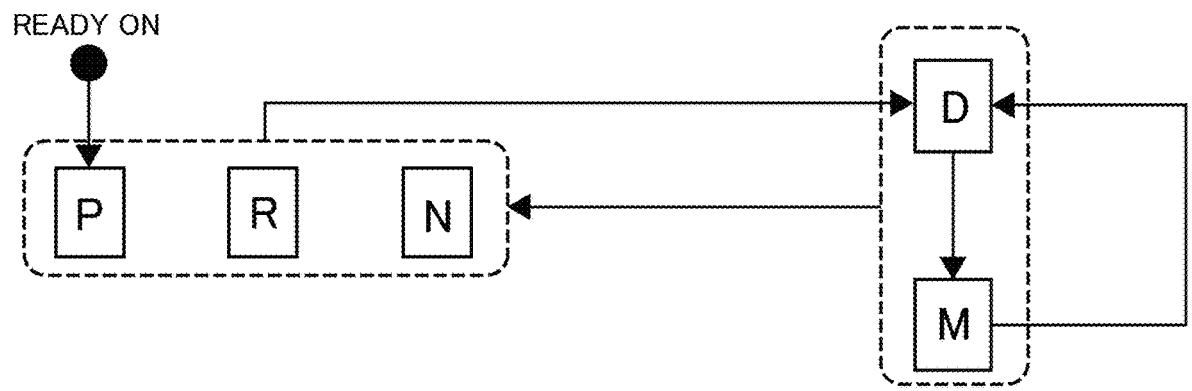
FIG. 7 is a change chart showing a transition of an operating mode in a conventional vehicle having an engine and a transmission.

As described, the control system according to the exemplary embodiment of the present disclosure is configured to allow the driver to virtually enjoy a feeling of a manual shifting operation of the conventional vehicle having an engine and a transmission. As shown in FIG. 7, in the conventional vehicle having an engine and a transmission, a manual shifting operation may become available by manipulating a shifting device to select a manual mode. In the manual mode, for example, an upshifting and a downshifting are executed by manipulating the shift lever 2b shown in FIG. 5 or the upshifting paddle 2f and the downshifting paddle 2g shown in FIG. 6. In the conventional vehicle having an engine and a transmission, a start switch may be turned on to bring the vehicle into a ready-on state in a situation where the shift lever is positioned at the parking position. In this situation, in order to operate the vehicle in the manual mode, the shift lever is moved from the parking position or the neutral position to the manual position via the drive position. That is, the shift lever may not be moved directly from the parking position or the neutral position to the manual position. For example, the operating mode is shifted to the manual mode by moving the shift lever 2b from the drive position to the manual position. Otherwise, the operating mode is also shifted to the manual mode by operating the upshifting paddle 2f or the downshifting paddle 2g in a specific manner while maintaining the shift lever 2b to the drive position. For example, the manual mode is cancelled by manually operating the shift lever 2b to other positions.

Figure 8:
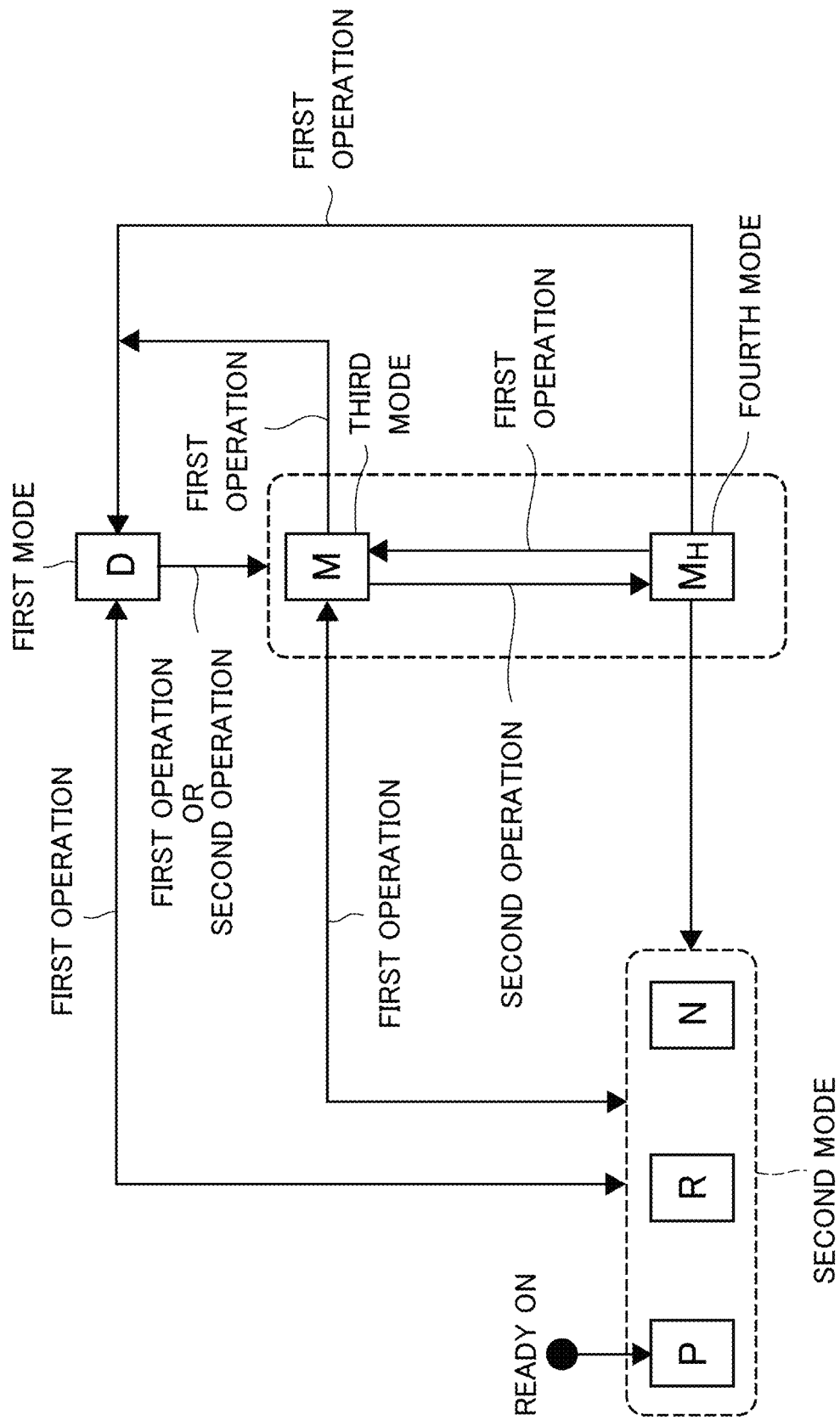
FIG. 8 is a change chart showing a transition of an operating mode in the electric vehicle to which the control system according to the exemplary embodiment of the present disclosure is applied.

As described, in the electric vehicles described in the above-mentioned prior art documents, the simulated engine sound is lost awkwardly when the shift lever is moved from the manual position to another position. In order to avoid such disadvantage, according to the exemplary embodiment of the present disclosure, a manual hold mode ($M_H$) shown in FIG. 8 may be selected to maintain the emission of the simulated engine sound even if the operating mode is shifted from the manual hold mode to e.g., the neutral mode.

In the manual mode as a third mode of the exemplary embodiment of the present disclosure, the target torque value of the motor 1 varies stepwise in accordance with the operating range selected from the plurality of ranges in which torque characteristics with respect to a speed of the motor 1 differ from one another. That is, the driver is allowed to virtually enjoy the manual shifting operation as the conventional vehicle having an engine and a transmission. In addition, the simulated engine sound is emitted during operation in the manual mode.

In the manual hold mode as a fourth mode of the exemplary embodiment of the present disclosure, the target torque value of the motor 1 also varies stepwise in accordance with the operating range selected from the plurality of ranges in which torque characteristics with respect to a speed of the motor 1 differ from one another. That is, the driver is also allowed to virtually enjoy the manual shifting operation of the conventional vehicle having an engine and a transmission. In addition, the simulated engine sound is also emitted during operation in the manual hold mode, and is maintained even when the operating mode is shifted to the neutral mode, the reverse mode, or the parking mode.

In addition, in the exemplary embodiment of the present disclosure, the drive mode corresponds to a first mode, and a second mode includes the parking mode, the reverse mode, and the neutral mode.

The operating mode of the vehicle Ve is shifted by manipulating the shift lever 2b of the lever shifter 2a among the above-mentioned positions, and a power switch (also referred to as a main switch or a start switch) may be turned on to bring the vehicle Ve into a ready-on state in a situation where the shift lever 2b is positioned at the parking position. As described, the shift lever 2b may not be moved directly from the parking position, the reverse position, or the neutral position to the manual position. Therefore, the operating mode may not be shifted directly from the second mode including the parking mode, the reverse mode, and the neutral mode to the third mode as the manual mode and the fourth mode as the manual hold mode.

That is, the operating mode is shifted from the first mode as the drive mode to the third mode as the manual mode without exception. For example, the operating mode is shifted to the manual mode by moving the shift lever 2b from the drive position to the manual position. Otherwise, the operating mode is also shifted to the manual mode by operating the upshifting paddle 2f or the downshifting paddle 2g in a normal manner while maintaining the shift lever 2b to the drive position. By contrast, the manual mode is cancelled e.g., by manually shifting the operating mode to the manual hold mode or the first mode corresponding to the drive mode.

Thus, the operating mode is shifted by manipulating the lever shifter 2a shown in FIG. 5 or the paddle shifter 2e shown in FIG. 6 in a normal manner among: the first mode corresponding to the drive mode; the second mode corresponding to the parking mode, the reverse mode, and the neutral mode; and the third mode corresponding to the manual mode. Specifically, the operating mode is shifted among the first mode, the second mode, and the third mode by moving the shift lever 2b of the lever shifter 2a to a predetermined position within a normal (i.e., short) period of time. Otherwise, the operating mode is shifted among the first mode, the second mode, and the third mode by pulling the upshifting paddle 2f or the downshifting paddle 2g within a normal (i.e., short) period of time. Such operations of the lever shifter 2a and the paddle shifter 2e in the normal manner correspond to the above-mentioned first operation. In addition, the operating mode is also shifted from the third mode as the manual mode to the second mode including the parking mode, the reverse mode, and the neutral mode by carrying out the first operation.

Whereas, the operating mode is shifted to the fourth mode as the manual hold mode from the first mode as the drive mode or the third mode as the manual mode without exception. As described, the operating mode is shifted to the fourth mode as the manual hold mode by moving the shift lever 2b from the drive position to the manual position and operating the shift lever 2b in a different way than normal. Otherwise, the operating mode is shifted to the fourth mode as the manual hold mode by operating the upshifting paddle 2f or the downshifting paddle 2g in a different way than normal in the situation where the shift lever 2b is positioned at the drive position.

For example, the operating mode is shifted to the fourth mode as the manual hold mode by moving the shift lever 2b from the drive position to the manual position and keeping the shift lever 2b to be inclined for a longer period of time compared to the case of shifting the operating mode to the manual mode by the first operation. Instead, the operating mode may also be shifted to the fourth mode as the manual hold mode by moving the shift lever 2b from the drive position to a manual hold position which may be arranged e.g., in the vicinity of the manual position. Otherwise, the operating mode may also be shifted to the fourth mode as the manual hold mode by pulling the upshifting paddle 2f or the downshifting paddle 2g for a longer period of time compared to the first operation. In addition, the operating mode may also be shifted to the fourth mode as the manual hold mode by turning on the dedicated switch device (not shown). The above-mentioned second operation includes such operations of the lever shifter 2a and the paddle shifter 2e in a different way than the first operation as the normal operation, and the operation of the dedicated switch device to shift the operating mode to the manual hold mode.

The manual hold mode is cancelled by carrying out any of the first operations to shift the operating mode from the manual hold mode to the manual mode. That is, the operating mode is shifted from the fourth mode to any of the first mode, the second mode, and the third mode by the first operation. Nonetheless, the manual hold mode may also be cancelled by the second operation by operating the lever shifter 2a or the paddle shifter 2e for a longer period of time. In the case that the operating mode is shifted from the manual hold mode to the manual mode, the simulated engine sound is emitted as long as the manual mode is maintained. Then, the emission of the simulated engine sound is terminated when the manual mode is cancelled.

Thus, according to the exemplary embodiment of the present disclosure, the operations of the shifting device 2 is categorized into the first operation and the second operation. As described, the operating mode is shifted from the first mode or the third mode to the fourth mode as the manual hold mode by carrying out the second operation of the shifting device 2. That is, the driver executes the second operation intentionally to continue the emission of the simulated engine sound in the manual hold mode. Therefore, the driver is allowed to virtually enjoy the behavior of the conventional vehicle having an engine and a transmission in line with his/her intention. As described, the manual hold mode is cancelled by shifting the operating mode from the manual hold mode to the manual mode.

Thus, the manual hold mode is cancelled when the operating mode is shifted from the manual hold mode to the manual mode. In this situation, however, the driver is still allowed to enjoy the virtual manual shifting, and the simulated engine sound is continuously emitted as long as the manual mode is maintained. Then, when the operating mode is shifted from the manual mode to the drive mode, the manual mode is cancelled and the emission of the simulated engine sound is terminated. The manual mode is also cancelled by shifting the operating mode from the manual mode to the manual hold mode. In this case, however, the driver is still allowed to execute the virtual manual shifting and the simulated engine sound is continuously emitted as long as the manual hold mode is maintained.

Whereas, in a case that the operating mode is shifted from the manual hold mode to the drive mode, the manual hold mode will not be cancelled. In this case, therefore, the driver is still allowed to execute the virtual manual shifting and the simulated engine sound is continuously emitted. Then, even when the operating mode is further shifted from the drive mode to another mode, the manual hold mode will not be cancelled so that the emission of the simulated engine sound is continued. Likewise, in a case that the operating mode is shifted from the manual hold mode to the second mode, the manual hold mode will not be cancelled so that the emission of the simulated engine sound is also continued. Then, even when the operating mode is further shifted from the second mode to another mode, the manual hold mode will not be cancelled so that the emission of the simulated engine sound is also continued.

Thus, the operating mode and the operating range may be shifted by the first operation and the second operation as in the conventional vehicle having an engine and a transmission. According to the exemplary embodiment of the present disclosure, therefore, the driver is allowed to virtually enjoy the manual shifting operation as real as in the conventional vehicle having an engine and a transmission.

In order to maintain the simulated engine sound in the manual hold mode, the controller 5 is configured to execute routines shown in FIGS. 9 to 13.

Figure 9:
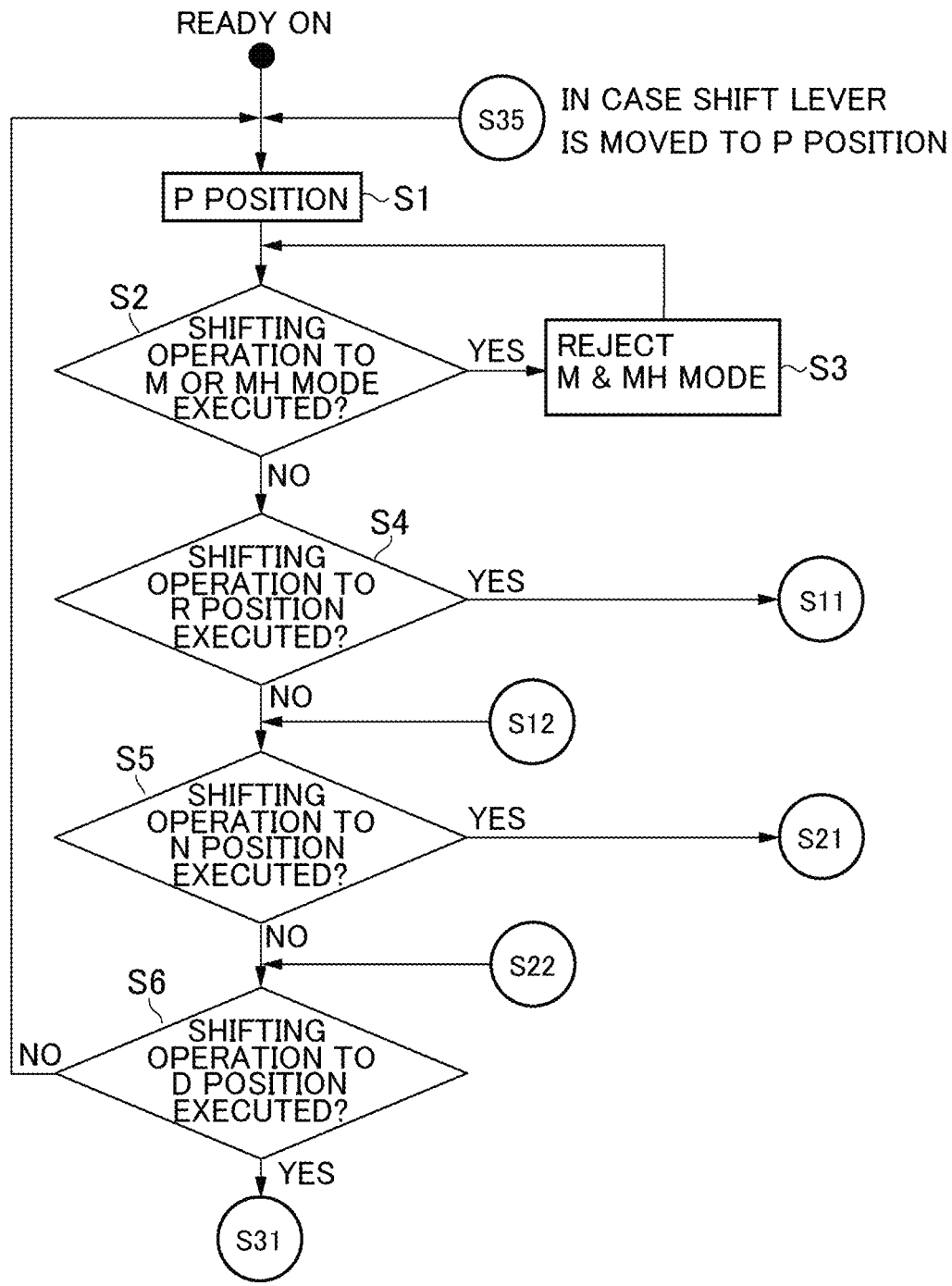
FIG. 9 is a flowchart showing a first part of a routine executed by the control system according to the exemplary embodiment of the present disclosure.

The routine shown in FIG. 9 is commenced when the power switch or the main switch is turned on to bring the vehicle Ve into the ready-on state. As described, the power switch or the main switch may be turned on to bring the vehicle Ve into the ready-on state in the situation where the shift lever 2b of the lever shifter 2a is positioned at the parking position. At step S1, the vehicle Ve is in the second mode as the parking mode.

Then, it is determined at step S2 whether the operation to shift the operating mode to the third mode as the manual mode or the fourth mode as the manual hold mode is executed. As described, the operating mode is shifted to the manual mode by executing the first operation of the shift lever 2b or any one of the upshifting paddle 2f and the downshifting paddle 2g. Whereas, the operating mode is shifted to the manual hold mode by executing the second operation of the shift lever 2b or any one of the upshifting paddle 2f and the downshifting paddle 2g. As described, for example, the operating mode is shifted to the manual hold mode by operating the shift lever 2b, the upshifting paddle 2f, or the downshifting paddle 2g for a longer period of time. Such determination at step S2 as well as determination of the operating mode at the following steps may be made based on e.g., the detection signal transmitted from the shift position sensor 4c.

If the shifting operation to the manual mode or the manual hold mode is executed so that the answer of step S2 is YES, the routine progresses to step S3 to reject the shifting operation to the manual mode or the manual hold mode.

As described, the shift lever 2b may not be moved directly from the parking position, the reverse position, or the neutral position to the manual position. That is, the operating mode may not be shifted directly from the second mode to the third mode as the manual mode and the fourth mode as the manual hold mode. At step S3, therefore, the shifting operation to the manual mode or the manual hold mode is rejected. In this situation, a warning tone is emitted or an error message is indicated to notify the driver of such rejection of the shifting operation to the manual mode or the manual hold mode. Thereafter, the routine returns to step S2 to repeat the above-explained determination.

By contrast, if the shifting operation to the manual mode or the manual hold mode is not executed so that the answer of step S2 is NO, the routine progresses to step S4 to determine whether an operation to shift the operating mode to the reverse mode is executed.

In other words, it is determined at step S4 whether the shift lever 2b of the lever shifter 2a is moved to the reverse position.

Figure 10:
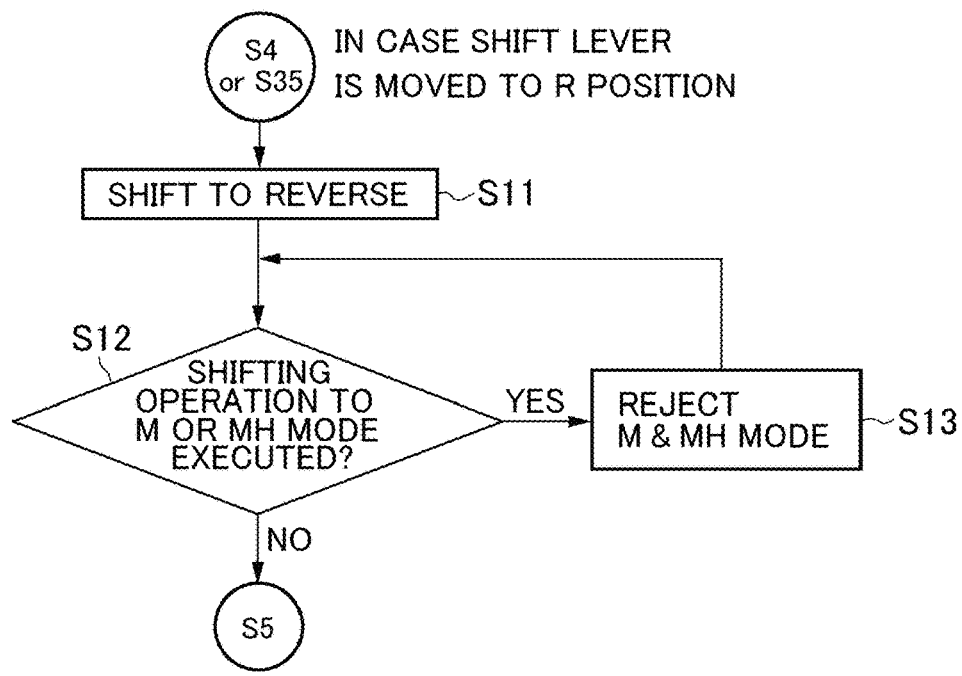
FIG. 10 is a flowchart showing a second part of the routine executed by the control system according to the exemplary embodiment of the present disclosure.

If the operation to shift the operating mode to the reverse mode is executed so that the answer of step S4 is YES, the routine progresses to step S11 shown in FIG. 10.

At step S11, the operating mode of the shifting device 2 is shifted to the reverse mode. That is, the operating mode still remains in the second mode in this situation.

Then, it is determined at step S12 whether the operation to shift the operating mode to the manual mode or the manual hold mode is executed.

If the shifting operation to the manual mode or the manual hold mode is executed so that the answer of step S12 is YES, the routine progresses to step S13 to reject the shifting operation to the manual mode or the manual hold mode.

In this case, the shifting operation to the manual mode or the manual hold mode is rejected for the same reason as explained at step S3. Thereafter, the routine returns to step S12 to repeat the above-explained determination.

By contrast, if the shifting operation to the manual mode or the manual hold mode is not executed so that the answer of step S12 is NO, the routine progresses to step S5 shown in FIG. 9 to determine whether an operation to shift the operating mode to the neutral mode is executed.

In other words, it is determined at step S5 whether the shift lever 2b of the lever shifter 2a is moved to the neutral position.

Figure 11:
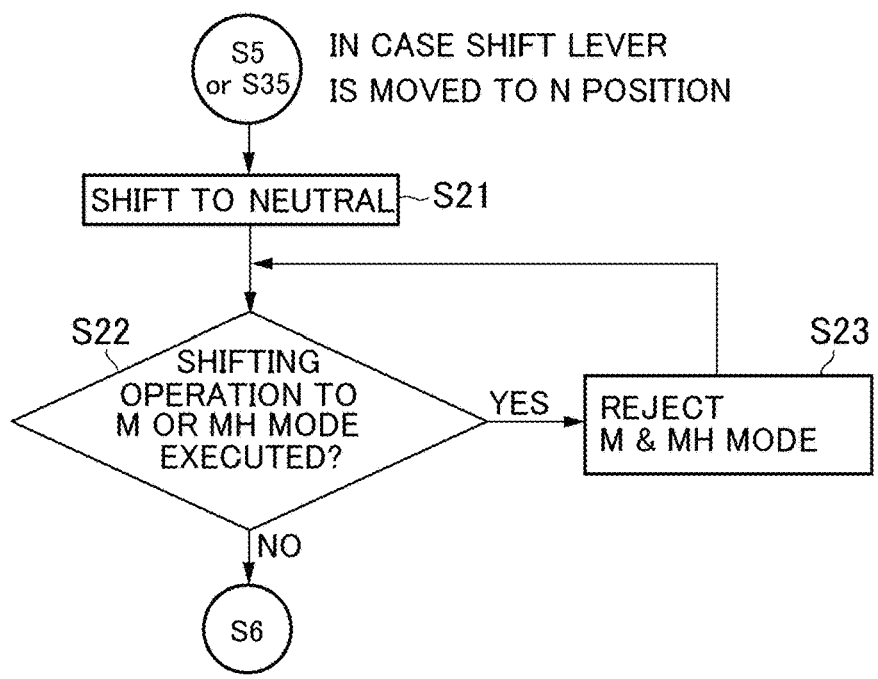
FIG. 11 is a flowchart showing a third part of the routine executed by the control system according to the exemplary embodiment of the present disclosure.

If the operation to shift the operating mode to the neutral mode is executed so that the answer of step S5 is YES, the routine progresses to step S21 shown in FIG. 11.

At step S21, the operating mode of the shifting device 2 is shifted to the neutral mode. That is, the operating mode still remains in the second mode in this situation.

Then, it is determined at step S22 whether the operation to shift the operating mode to the manual mode or the manual hold mode is executed.

If the shifting operation to the manual mode or the manual hold mode is executed so that the answer of step S22 is YES, the routine progresses to step S23 to reject the shifting operation to the manual mode or the manual hold mode.

In this case, the shifting operation to the manual mode or the manual hold mode is rejected for the same reason as explained at step S3. Thereafter, the routine returns to step S22 to repeat the above-explained determination.

By contrast, if the shifting operation to the manual mode or the manual hold mode is not executed so that the answer of step S22 is NO, the routine progresses to step S6 shown in FIG. 9 to determine whether an operation to shift the operating mode to the drive mode is executed.

In other words, it is determined at step S6 whether the shift lever 2b of the lever shifter 2a is moved to the drive position.

If the shifting operation to the drive mode is not executed, that is, if the shift lever 2b of the lever shifter 2a has not yet been moved from the parking position to other positions so that the answer of step S6 is NO, the routine returns to step S1 to repeat the foregoing steps.

Figure 12:
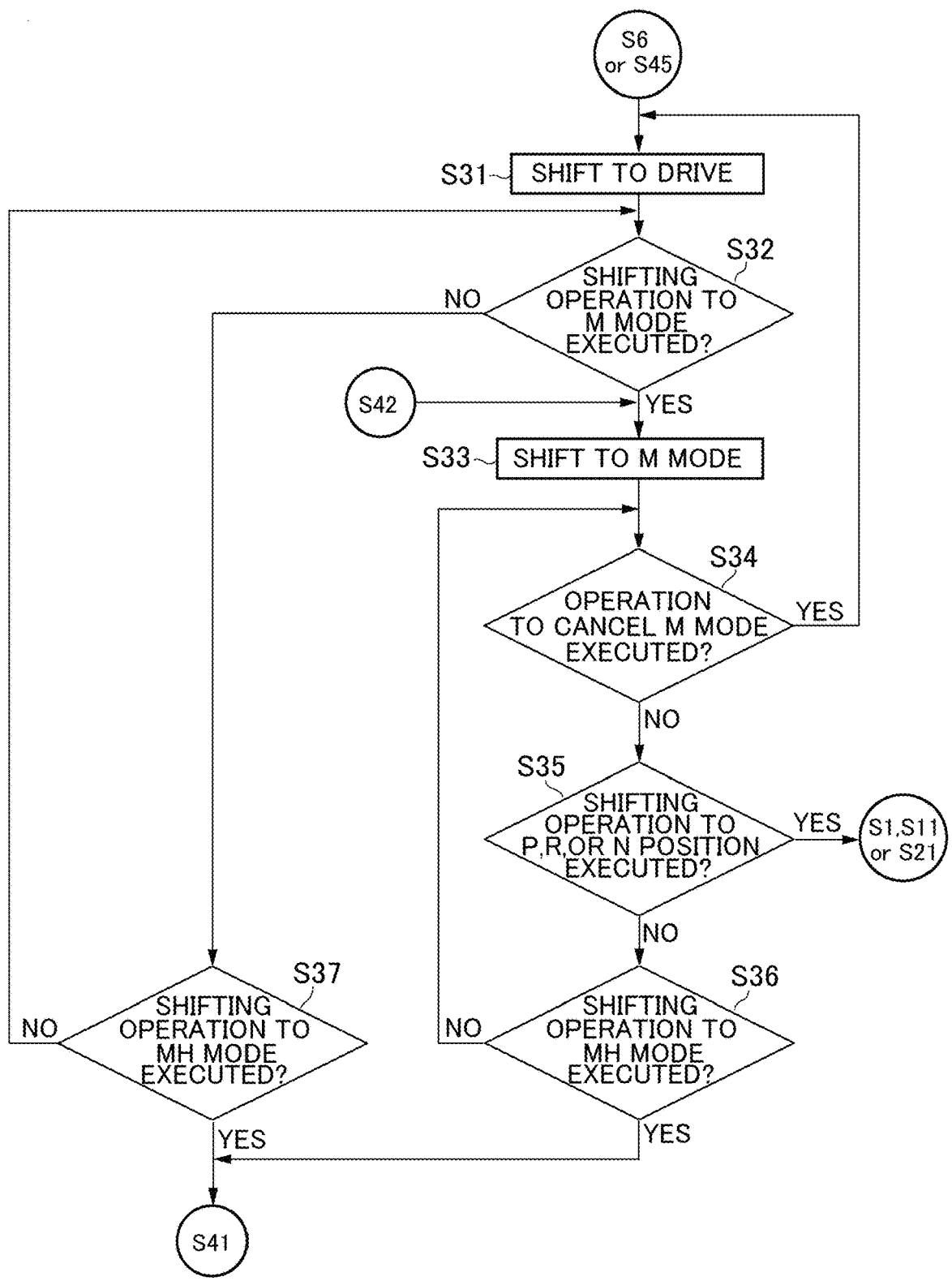
FIG. 12 is a flowchart showing a fourth part of the routine executed by the control system according to the exemplary embodiment of the present disclosure.

By contrast, if the shifting operation to the drive mode is executed so that the answer of step S6 is YES, the routine progresses to step S31 shown in FIG. 12.

At step S31, the operating mode of the vehicle Ve is shifted to the drive mode. That is, the operating mode is shifted to the first mode.

Then, it is determined at step S32 whether an operation to shift the operating mode to the manual mode is executed. In other words, it is determined at step S32 whether the shift lever 2b of the lever shifter 2a is moved from the drive position to the manual position.

If the shifting operation to the manual mode is executed so that the answer of step S32 is YES, the routine progresses to step S33 to shift the operating mode from drive mode as the first mode to the manual mode as the third mode.

Consequently, the driver is allowed to virtually enjoy the manual shifting operation as in the conventional vehicle having an engine and a transmission. In addition, the simulated engine sound is emitted while being changed in response to an execution of the virtual shifting operation.

Then, it is determined at step S34 whether an operation to cancel the manual mode is executed. As explained, the manual mode as the third mode is cancelled by manually shifting the operating mode to the manual hold mode as the fourth mode or the first mode as the drive mode. At step S34, therefore, it is determined whether the shift lever 2b of the lever shifter 2a is moved from the manual position to the drive position.

If the operation to cancel the manual mode is executed so that the answer of step S34 is YES, the routine returns to step S31 to repeat the foregoing steps from step S31. Consequently, the emission of the simulated engine sound is terminated.

By contrast, if the operation to cancel the manual mode as the third mode has not yet been executed so that the answer of step S34 is NO, the routine progresses to step S35 to determine whether an operation to shift the operating mode from the third mode to the second mode is executed.

At step S35, specifically, it is determined whether the shift lever 2b of the lever shifter 2a is moved from the manual position to the parking position, the reverse position, or the neutral position.

If the shifting operation to the second mode is executed so that the answer of step S35 is YES, the routine returns to step S1 shown in FIG. 9, S11 shown in FIG. 10, or S21 shown in FIG. 11. Specifically, the routine returns to step S1 to repeat the steps from step S1 in a case that the shift lever 2b is moved to the parking position, to step S11 to repeat the steps from step S11 in a case that the shift lever 2b is moved to the reverse position, and to step S21 to repeat the steps from step S21 in a case that the shift lever 2b is moved to the neutral position.

By contrast, if the shifting operation to the second mode has not yet been executed so that the answer of step S35 is NO, the routine progresses to step S36 to determine whether an operation to shift the operating mode from the manual mode to the manual hold mode is executed.

In other words, it is determined at step S36 whether the second operation is executed to shift the operating mode to the manual hold mode.

If the shifting operation to the manual hold mode has not yet been executed so that the answer of step S36 is NO, the routine returns to step S34 to repeat the foregoing steps from step S34.

Figure 13:
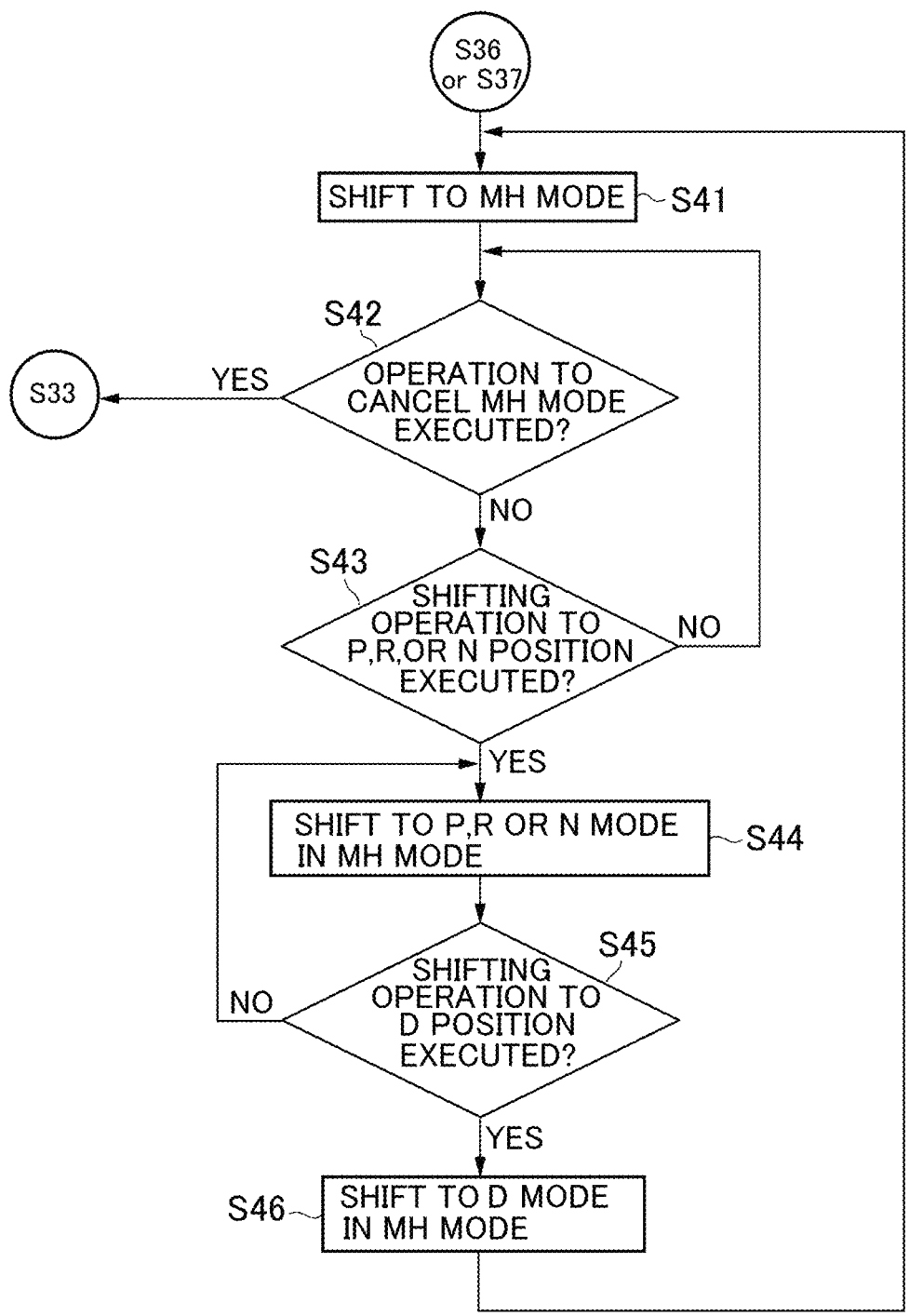
FIG. 13 is a flowchart showing a fifth part of the routine executed by the control system according to the exemplary embodiment of the present disclosure.

By contrast, if the shifting operation to the manual hold mode is executed so that the answer of step S36 is YES, the routine progresses to step S41 shown in FIG. 13 to shift the operating mode from the manual mode to the manual hold mode. Consequently, the manual mode is cancelled. However, since the operating mode is shifted to the manual hold mode, the driver is still allowed to virtually enjoy the manual shifting operation and the simulated engine sound is still emitted in this situation.

Whereas, if the shifting operation to the manual mode has not yet been executed so that the answer of step S32 is NO, the routine progresses to step S37 to determine whether the operation to shift the operating mode from the drive mode as the first mode to the manual hold mode as the fourth mode is executed.

In other words, it is determined at step S37 whether the second operation is executed to shift the operating mode to the manual hold mode.

If the shifting operation to the manual hold mode has not yet been executed so that the answer of step S37 is NO, the routine returns to step S32 to repeat the foregoing steps from step S32.

By contrast, if the shifting operation to the manual hold mode is executed so that the answer of step S37 is YES, the routine also progresses to step S41 shown in FIG. 13 to shift the operating mode from drive mode as the first mode to the manual hold mode as the fourth mode.

Consequently, the driver is allowed to virtually enjoy the manual shifting operation and the simulated engine sound is emitted. Once the manual hold mode is selected, the simulated engine sound is emitted until the manual hold mode is cancelled.

Then, it is determined at step S42 whether an operation to cancel the manual hold mode is executed. Specifically, the manual hold mode as the fourth mode is cancelled by shifting the operating mode from the manual hold mode to the manual mode as the third mode.

If the manual hold mode is cancelled by shifting the operating mode from the manual hold mode to the manual mode so that the answer of step S42 is YES, the routine returns to step S33 shown in FIG. 12 to repeat the foregoing steps from step S33. In this situation, the operating mode is shifted to the manual mode, but the emission of the simulated engine sound is continued.

By contrast, if the operation to shift the operating mode to the manual mode to cancel the manual hold mode has not yet been executed so that the answer of step S42 is NO, the routine progresses to step S43 to determine whether an operation to shift the operating mode from manual hold mode as the fourth mode to the second mode is executed.

At step S43, specifically, it is determined whether the shift lever 2b of the lever shifter 2a is moved to the parking position, the reverse position, or the neutral position.

If the shifting operation to the second mode has not yet been executed so that the answer of step S43 is NO, the routine returns to step S42 to repeat the determination at step S42.

By contrast, if the shifting operation to the second mode is executed so that the answer of step S43 is YES, the routine progresses to step S44 to shift the operating mode to the parking mode, the reverse mode, or the neutral mode.

In this situation, although the operating mode is shifted to the second mode corresponding to the parking mode, the reverse mode, and the neutral mode, the emission of the simulated engine sound is continued.

Then, it is determined at step S45 whether an operation to shift the operating mode to the drive mode corresponding to the first mode is executed.

If the operation to shift the operating mode to the drive mode has not yet been executed so that the answer of step S45 is NO, the routine returns to step S44 to maintain the parking mode, the reverse mode, or the neutral mode in the manual hold mode and to repeat the determination at step S45.

By contrast, if the operation to shift the operating mode to the drive mode is executed so that the answer of step S45 is YES, the routine progresses to step S46 to shift the operating mode to the drive mode while maintaining the manual hold mode.

In this situation, although the operating mode is shifted to the drive mode, the driver is still allowed to execute the virtual manual shifting, and the emission of the simulated engine sound is continued. That is, the manual hold mode is maintained. Thereafter, the routine returns to step S41 to repeat the foregoing steps from step S41.

For example, the series of routines shown in FIGS. 9 to 13 are terminated by turning off the power switch or the main switch of the vehicle Ve.

Thus, in the electric vehicle to which the control system according to the exemplary embodiment of the present disclosure is applied, the target torque value of the motor 1 set based on the torque characteristics of the motor 1 may be changed stepwise in response to a manual shifting operation of the operating range in the manual mode or the manual hold mode. Therefore, although the electric vehicle to which the control system according to the exemplary embodiment of the present disclosure is applied does not have a manual transmission, the driver is allowed to virtually enjoy the manual shifting operation as in the conventional vehicle having an engine and a transmission.

In addition, the simulated engine sound is emitted during operation in the manual mode and the manual hold mode, and the simulated engine sound varies in response to an execution of the manual shifting operation and a change in the running condition of the vehicle Ve. As described, the manual mode is cancelled by shifting the operating mode to the manual hold mode or the first mode corresponding to the drive mode, and the manual hold mode is cancelled by shifting the operating mode to the manual mode. That is, once the operating mode is shifted to the manual hold mode, the emission of the simulated engine sound is continued until the operating mode is shifted from the manual hold mode to the manual mode and further shifted to the first mode as the drive mode. According to the exemplary embodiment of the present disclosure, therefore, the simulated engine sound will not be lost awkwardly even when the operating mode is shifted from the manual mode or the manual hold mode to the second mode including the parking mode, the reverse mode, and the neutral mode. For this reason, a simulated revving sound may be emitted in the parking mode or the neutral mode by depressing the accelerator pedal.

Thus, according to the exemplary embodiment of the present disclosure, the driver is allowed to enjoy the behavior of the conventional vehicle having an engine and a transmission more realistically, without impairing comfort and quietness of the electric vehicle.

What is claimed is:

1. A control system for an electric vehicle that controls a motor serving as a prime mover based on a target torque value set in accordance with a required drive force, comprising:
  a sound creator that creates a simulated engine sound in accordance with a travelling condition of the electric vehicle;
  a controller that controls an output torque of the motor based on the target torque value; and
  a shifting device that is operated manually by a driver to
    select an operating mode of the electric vehicle from a first mode, a second mode, a third mode, and a fourth mode, and
    select an operating range of the electric vehicle from a plurality of ranges in which torque characteristics with respect to a speed of the motor differ from one another, in a situation where the third mode or the fourth mode is selected,
  wherein the first mode corresponds to a drive mode in which the electric vehicle is propelled forward,
  the second mode includes a reverse mode in which the electric vehicle is reversed, a parking mode in which the electric vehicle is parked, and a neutral mode in which a torque transmission between the motor and a pair of drive wheels is interrupted,
  the third mode is shifted from the first mode, and in the third mode, the target torque value of the motor with respect to a speed of the motor varies stepwise in accordance with the operating range selected by operating the shifting device and the simulated engine sound is emitted by the sound creator,
  the fourth mode is shifted from the first mode or the third mode, and in the fourth mode, the target torque value of the motor also varies stepwise in accordance with the operating range selected by operating the shifting device and the emission of the simulated engine sound is maintained, and
  the controller is configured to
  control the output torque of the motor based on the target torque value set in accordance with the operating mode and the operating range selected by operating the shifting device,
  cancel the third mode from being selected when the operating mode is shifted from the third mode to the first mode or the fourth mode, and
  cancel the fourth mode from being shifted from the third mode when the operating mode is shifted from the fourth mode to the third mode.

2. The control system for the electric vehicle as claimed in claim 1,
  wherein the operation of the shifting device includes a first operation as a normal operation and a second operation different from the first operation,
  the operating mode is shifted by the first operation between the first mode and the second mode, between the first mode and the third mode, from the third mode to the second mode, from the fourth mode to the first mode, from the fourth mode to the second mode, and from the fourth mode to the third mode,
  an operation of the shifting device to shift the operating mode from the second mode to the third mode or the fourth mode is rejected, and
  the operating mode is shifted by the second operation from the first mode to the fourth mode, and from the third mode to the fourth mode.

3. The control system for the electric vehicle as claimed in claim 1,
  wherein the controller is further configured to calculate a virtual engine speed based on an assumption that a drive force to propel the electric vehicle in a current travelling condition is generated by a conventional internal combustion engine, and
  the sound creator is configured to emit the simulated engine sound in accordance with a change in the virtual engine speed.

4. The control system for the electric vehicle as claimed in claim 2,
  wherein the controller is further configured to calculate a virtual engine speed based on an assumption that a drive force to propel the electric vehicle in a current travelling condition is generated by a conventional internal combustion engine, and
  the sound creator is configured to emit the simulated engine sound in accordance with a change in the virtual engine speed.

* * * * *